US006319184B1

(12) United States Patent
DeMatteis et al.

(10) Patent No.: US 6,319,184 B1
(45) Date of Patent: Nov. 20, 2001

(54) APPARATUS AND PROCESS FOR PRODUCING COLD SEAL IN PLASTIC BAGS

(75) Inventors: Robert B. DeMatteis, Grass Valley, CA (US); Donald Pansier, Greenbay, WI (US)

(73) Assignee: Bob Dematteis Co., Grass Valley, CA (US)

( * ) Notice: Subject to any disclaimer, the term of this patent is extended or adjusted under 35 U.S.C. 154(b) by 0 days.

(21) Appl. No.: 09/257,848

(22) Filed: Feb. 25, 1999

Related U.S. Application Data

(60) Provisional application No. 60/088,612, filed on Jun. 9, 1998, provisional application No. 60/088,613, filed on Jun. 9, 1998, provisional application No. 60/089,582, filed on Jun. 17, 1998, provisional application No. 60/089,583, filed on Jun. 17, 1998, provisional application No. 60/092,232, filed on Jul. 9, 1998, and provisional application No. 60/092,233, filed on Jul. 9, 1998.

(51) Int. Cl.[7] ...................................................... B31B 1/00
(52) U.S. Cl. ........................... 493/186; 493/190; 493/936
(58) Field of Search ..................................... 493/936, 218, 493/186, 190, 203, 189, 210; 53/375.3

(56) References Cited

U.S. PATENT DOCUMENTS

| | | | |
|---|---|---|---|
| 4,856,259 | * | 8/1989 | Woo et al. . |
| 4,925,512 | * | 5/1990 | Briand . |
| 5,135,464 | * | 8/1992 | Buchanan . |
| 5,468,206 | * | 11/1995 | Buchanan . |
| 5,814,382 | * | 9/1998 | Yannuzzi, Jr. . |
| 5,894,709 | * | 4/1999 | Fosshage . |
| 6,090,028 | * | 7/2000 | Yannuzzi, Jr. ........................ 493/189 |

* cited by examiner

Primary Examiner—Eugene Kim
(74) Attorney, Agent, or Firm—Townsend and Townsend and Crew LLP

(57) ABSTRACT

A process of cold sealing two layers of plastic film material together is used as part of the structural element of a plastic bag made from plastic film. The bag has a closed bottom, a continuous closed periphery, and an open top. The improvement provides the bag with a cold seal, which cold seal does not form a part of the closed bottom and continuous closed periphery of the bag. In the improved process, it is required that the first and second plastic films of the bag be confronted to one another in a disposition for sealing. Compression dies are provided on at least one side of the juxtaposed first and second plastic films, the compression dies are provided with the size and shape of the cold seal desired. Impressing of the compression dies across the juxtaposed first and second plastic films occurs. This impressing is at a temperature and pressure sufficient to fuse the first and second plastic films together. However, the impressing has insufficient temperature and pressure to permanently fuse the first and second plastic films together so that the films when separated at the cold seal each retain structural integrity. Embodiments are set forth where the cold seal is used as a structural element to square out square bottom bags. Specifically, the cold seal is provided with at least a linear disposition which imparts to the cold seal the predisposition to fold or hinge at the boundary to cause opening to the square bottom shape.

11 Claims, 11 Drawing Sheets

APPARATUS AND PROCESS FOR PRODUCING COLD SEAL IN PLASTIC BAGS

CROSS-REFERENCES TO RELATED APPLICATIONS

This application claims priority from Provisional Patent Application No. 60/088,613 filed Jun. 9, 1998 by the named inventor herein entitled Plastic Film Hinging patent application Ser. No. 09/257,345 filed Feb. 25, 1999 of even date herewith entitled Plastic Film Hinging and Precreasing Process is likewise incorporated by reference as if fully set forth herein.

This application claims priority from Provisional Patent Application entitled Cold Sealing of Plastic Film No. 60/088,612 filed Jun. 9, 1998 by the named inventor herein.

This application claims priority from Provisional Patent Application No. 60/089,582 filed Jun. 17, 1998 by the named inventor herein entitled Plastic Bag Bundling System. patent application Ser. No. 09/258,015 filed Feb. 25, 1999 of even date herewith entitled Plastic Bag Bundling System is likewise incorporated by reference as if fully set forth herein.

This application claims priority from Provisional Patent Application No. 60/089,583 filed Jun. 17, 1998 by the named inventor herein with Don Pansier of Greenbay Wis. entitled Automatic Ventilating System.

This application claims priority from Provisional Patent Application No. 60/092,232 filed Jul. 9, 1998 entitled Plastic Bag Manufacturing Process by the named inventor herein. patent application Ser. No. 09/257,361 filed Feb. 25, 1999 of even date herewith entitled Plastic Bag Manufacturing Process is likewise incorporated by reference as if fully set forth herein.

Finally, this application claims priority from Provisional Patent Application No. 60/092,233 filed Jul. 9, 1998 entitled Plastic Film Rigidity Means by the named inventor herein.

The above Provisional Applications and all following Regular Patent Applications filed of even date herewith—and all of them—are herein incorporated by reference as if fully set forth herein.

FIELD OF THE INVENTION

This invention relates to plastic bag and film products that may be used for a multitude of purposes such as, but not limited to, fast foods, supermarkets, retail merchandise and point-of-purchase bags. More specifically, this invention relates to placing a useful cold seal in these plastic bags and products. For example, the cold seal is used so the bags may be fabricated in the lay flat disposition but thereafter take on specific shapes and forms, such as a square bottom. This disclosure covers the methods by which the cold seals are placed in such products.

BACKGROUND OF THE INVENTION

Cold Seals Generally

Cold seals are known. Cold seals are also infamous in plastic bag manufacture. Some explanation is in order.

When plastic was first considered as a bag material, difficulty was encountered in sealing such bags. The desired seal was the so-called "hot seal." In such a hot seal, two layers of plastic were sealed together under a temperature and pressure where the molecular structure of the two bag layers permanently bonded and fused together.

A permanent "hot seal" is easy to identify. If one tries to tear apart the joined layers of a hot seal on a plastic bag, the seal—being two layers thick—will not part. Instead, either of the two joined layers will separate well before the hot seal itself will separate.

Unfortunately, where insufficient dwell time, insufficient pressure or insufficient temperature is utilized in what is attempted to be a "hot seal", an imperfect hot seal results which is commonly referred to as a cold seal. Such a "cold seal" can be recognized by tearing the cold seal a part. When a cold seal is torn apart, the two joined layers of plastic separate with their structural integrity intact. It is the "cold seal" that fails and tears.

The infamy of "cold seals" relates to the customer public relations disaster, which almost always occurs when a defective "hot seal" opens in the manner of a "cold seal." Simply stated, the customer is usually leaving the store with his plastic bags filled with carefully selected and purchased merchandise. During this departure, the defective "hot seal"—which in reality is a "cold seal"—opens. The merchandise crashes to the floor—usually with some damage.

For the reasons set forth above, the prior art has been stead fast in its avoidance of "cold seals."

Cold seals have found one place where they have utility. Cold sealing of plastic film is a well-known process and has been applied in a multitude of ways in bag stacks to cause the bag plies to stick together in the bag pack and self open the next bag in sequence. This is described in U.S. Pat. No. 5,183,158 to Boyd and U.S. Pat. No. 5,562,580 to Beasley, et al. Both Boyd and Beasley reveal bags that have been corona treated in order to selectively cold seal—or weld—the plastic film layers together in a stack of bags.

It is to be understood that in this use, the "cold seal" does not form a structural element of the bag. In fact it has been the very careful intent of the prior art to avoid cold seals in any structural element of a bag. As will be seen herein, I claim invention in utilizing "cold seals" for the essential "one time opening" of bags fabricated in the lay flat condition to open and square out with a square bottom.

Plastic Bags Generally

Common plastic bag styles used by retailers in fast food chains, supermarkets, and general merchandise, as well as in point-of-purchase applications, are typically of the bottom seal or sideweld variety and have hot seals at these locations.

These bags are usually gusseted along their sides or along the bottom with the open bag mouth at the top. Many of these common bags have carrying handles, usually of the strap variety or die-cut holes. Typical plastic bags used in supermarket applications are about 0.0005 to 0.00065 in gauge; those used in retail merchandise bags are from 0.0005 to 0.0001; fast food bags are usually from 0.0007 to 0.00125, and; those used in point of purchase applications are typically from 0.001 to 0.004 mil thick.

Retailers usually desire to have a bag stand up on its own during clerk bag loading. Usually square bottom paper bags are used instead of plastic bags. Simply stated, square bottom paper bags stand up; plastic bags used in point-of purchase applications typically do not stand up well at all, unless they are a pouch which typically takes on a rounded shape instead of a rectangular shape like boxes.

Common plastic bags have a cost efficiency. Unfortunately, for clerk and customer, such bags have a "use" inefficiency. This "use inefficiency" relates to the multiple steps, which must be undertaken to use such bags.

Common plastic bags when manually put into use usually follow a certain sequence.

First, the clerk's fingers open the bag mouth.

Second, the clerk at one hand grasps one side of the open mouth at the top.

Third, the clerk with the other hand grasps the opposing side of the bag mouth at the top.

Fourth, the bag is pulled upward to capture air and billow open.

Fifth, the clerk's hand is inserted in the bag to "find the bottom" as the bag is placed on the packing surface.

Sixth, once the bottom is found, the hand is withdrawn, and; seventh, the user grasps the merchandise and begins loading the bag.

Variations on this theme may include the shaking of bags to get them open, the support of such bags in the open position from special racks or any of a myriad of other techniques necessary to simultaneously fill and support the bags.

Most common plastic bags are not fabricated with joints and structure to allow the bag to stand up. It would take a user several seconds to open up and put a common plastic bag in the right shape to make it stand up. It is impractical for a user in a high volume retail outlet to do this, as the cost of labor is substantial. This is one key reason most fast food restaurants still use paper bags.

Contrasted with this technique, paper bags when opened are usually set upright and allow the user to place merchandise inside the bag at the bottom. Likewise, when the bags are unloaded at home, again they are capable of standing upright. It is for this store loading convenience, the upright standing paper bags are preferred by clerks and for the home unloading convenience the upright standing paper bags are preferred by customers.

The need for economical square bottom, thin-gauged plastic bags that stand up is well-known. Some 30 plus patents in the field reflect the extreme need, but yet not a single process exists that is cost effective. The cumbersome processes associated with the many alternate methods of creating square bottom, stand-up plastic bags is evident in the bottom seal bag variety of Hansen et al, U.S. Pat. No. 3,988,870 and 4,929,224; Brinkmeier U.S. Pat. No. 3,896,709; La Fleur U.S. Pat. No. 3,915,077 and Platz, U.S. Pat. No. 3,917,159. Others have come closer to an economically viable product with the means illustrated in Ross, U.S. Pat. No. 5,102,384, and Roen U.S. Pat. No. 4,717,262. But as of yet, no process has been anywhere close to the cost effectiveness of current T-shirt manufacturing processes or that of common bottom seal and sideweld plastic bags, all these bags without a "squared out bottom."

In the high-speed bag manufacturing processes used throughout the world, plastic bags are typically made from tube stock. This tube stock is cut out and sealed—either bottom sealed or side welded—as the last step before being packed in a carton.

Placing a square bottom on an already manufactured bag has proven to be costly. To clamp and fold over and/or seal gussets together after a bag has already been cut and sealed from its tube stock in order to create a square bottom bag is not economically viable. As illustrated in the above patents, Ross '384 and Platz '159, this bag forming process requires a costly secondary operation after the bottom sealing process is completed and the bag has been cut free from the tube stock. These processes use a relatively sophisticated grasping and clamping to accomplish the folding process. As defined in Hansen '224, the making these square bottom bags requires placing a mandrel inside the tube prior to cutting and sealing. This too is unreliable and too costly for many reasons. Tube widths vary greatly—a narrow tube would cause the mandrel to lock up inside the tube and then break the tube—a slightly wider tube would result in not having a properly formed bag. Further, this process requires narrow plastic tubes instead of the wider, more efficient ones used on 3–5 lane machines. Finally, the bag machine speeds are slow. These three factors drive up the prices of the bags making them impractical when compared to paper or other alternative technologies.

La Fleur, '077, reveals angle sealing that is more cost effective than the three others listed above, but is still too costly for bags made on modern, high-speed bag equipment that typically runs 3–5 lanes across and in speeds in excess of 125 cycles per minute. Trying to simultaneously control the heat sealing (or any folding means, for that matter) of 12 to 24 side gusset pairs per cycle results in either substantially reducing the machine's speed or a highly unreliable, inconsistent outcome at best. The inconsistent output results in uneven seals, which then causes irregular, cockeyed bag bottoms once they are opened and a user tries to stand them up.

All of the above bag styles will cost substantially more to produce than common plastic bag styles, generally as much as 20–30%, even up to 300% more, depending upon size. Only the Roen '262 bag product can produce an economically cost-effective bag but is limited to side weld bag production and is not practical on smaller bags running 3–5 lanes across.

Of particular importance in the field of plastics packaging is that heat sealing plastic bags—whether that be the angle seals as described in La Fleur '077 or a common bottom sealing process—is typically accomplished at temperatures of around 500 F. degrees. This is because at high cycling speeds, it is desirable to seal the plastic film as fast as possible, in which hot temperatures are required. In order to seal effectively at hot temperatures in the 500-degree range, an insulating material such as Teflon is placed between the plastic material and the 500-degree hot heat seal bar, preventing the molten plastic from sticking to the metallic heat seal bar. This would be the normal, traditional means of heat sealing plastic film products used by virtually every major, high-volume manufacturer in the U.S. and most likely the world. A means of sealing plastic film for any variety of uses, including bottom sealing, side welding or angle-sealing that can improve upon this means would be of tremendous value.

Another methodology of creating seals at the angular bottom portions of squared out plastic bags of the side gussets is revealed in U.S. Pat. No. 5,195,829 to Watkins in which adhesive is used to bond the triangular portions of a square bottom together. Even use of adhesive is possible in the popcorn bags described in the '829 patent which is a form and fill operation.

It is important to note that angle seal technology can also produce uneven or even incomplete seals, which may result in irregular bag bottoms once they are opened and placed into use.

SUMMARY OF THE INVENTION

A process of cold sealing two layers of plastic film material together is used as part of the structural element of a plastic bag made from plastic film. The plastic bag is formed with a front panel having two substantially parallel side edges; a rear panel having two substantially parallel side edges; and a fastening of the front panel and rear panel for forming a continuous periphery to the bag. It is required the plastic bag have a bottom joining the bottom of the front panel, and the bottom of the rear panel at substantial right angles to the side edges of the front panel and rear panel. This imparts to the bag a closed bottom, a continuous closed periphery, and an open top. The improvement provides the bag with a cold seal, which cold seal does not form a part of the closed bottom and continuous closed periphery of the bag. In the improved process, it is required that the first and second plastic films of the bag be confronted to one another in a disposition for sealing. Compression dies are provided on at least one side of the juxtaposed first and second plastic films, the compression dies are provided with the size and shape of the cold seal desired. Impressing of the compression dies across the juxtaposed first and second plastic films occurs. This impressing is at a temperature and pressure sufficient to fuse the first and second plastic films together. However, the impressing has insufficient temperature and pressure to permanently fuse the first and second plastic films together so that the films when separated at the cold seal each retain structural integrity. Embodiments are set forth where the cold seal is used as a structural element to square out square bottom bags. Specifically, the cold seal is provided with at least a linear disposition, which imparts to the cold seal the predisposition to fold or hinge at the boundary to cause opening to the square bottom shape.

One of the most important applications of this cold seal is the placement of a hinge. Specifically, two layers of plastic film are less than permanently joined together along a linear boundary. This joinder preferably occurs in the lay flat disposition while the bag is being manufactured. In this case, the cold seals are place where hinging of a square bottom plastic bag is required to predispose the bag to open with a square bottom.

When the bag is first opened by a clerk, the films joined at the top of the bag are parted from the lay flat disposition. Specifically, the clerk parts the front bag panel and the rear bag panel adjacent the opening, and then pulls the bag rapidly through the air. When the films are parted and air is introduced into what will become a square bottom bag, parting of the opened tissue occurs until the air penetrating the bag, reaches the cold seal.

When the air reaches the cold seal, the joined bag walls no longer separate. Instead, separation ceases at the cold seal and the material of the bag hinges at the cold seal. This hinging occurs because the bag continues to expand responsive to the in rush of air but is prevented by the cold seal from further separation at the cold seal.

Thus, the present invention refers to a simple process of cold sealing plastic film that results in substantially the same effect as the heat sealing methods described in LaFleur '077, Hummel '565 and Roen '262 and the adhesive bonded bag of Watkins '829 (without the use of adhesive). It also relates to some of the resultant plastic bag products, more specifically flat bottom bags. However, the present invention reveals for the first time a means of cold sealing plastic film in a high-speed process with superior qualities than that provided by the aforementioned heat sealing or adhesive processes. This cold sealing process may be applied to the plastic bag film layers before it is cut and sealed into a bag of predetermined length, which then does not significantly affect line speed. Unlike the heat sealing methodology of La Fleur '077, Roen '262 and Hummel '565 which requires controlling 4 individual heat seals per bag, the present invention requires only one simple operation per bag—which operation can be simultaneously conducted on 3–5 lanes without significantly affecting line speed. Furthermore, this cold seal technology can be applied along with the hinging technology revealed in my co-pending application, Provisional Patent Application No. 60/088,613 filed Jun. 9, 1998 by the named inventor herein entitled Plastic Film Hinging now patent application Ser. No. 09/257,345 filed Feb. 25, 1999 of even date herewith entitled Plastic Film Hinging and Precreasing Process is likewise incorporated by reference as if fully set forth herein.

In these applications, hinges are used to produce a superior flat bottom, stand up bag. When doing so, the cold seals and the hinges are applied in the same single impressing operation. The reader will understand that the production of a hybrid cold seal and hinge is also possible. In this latter case, the imperfect joinder between two film layers also relates to the wall being thinned to form a hinge.

This cold sealing process is easily adapted to existing high-speed bag making equipment and technology—both bottom seal and sideweld. The methodology of applying angular cold seals to gussets also produces a seal that lies across the entire gusset pairs—right up to and even past the center gusset creases—which is virtually impossible with the prior art heat seal or adhesive technology. The present invention cold seal process applied to common plastic bags in a high-speed mode ensures great accuracy in consistently producing high quality, square bottom plastic bags that stand up Applying the present invention as an angular gusset cold seal on the side gussets of bottom seal bags or the bottom gusset on sideweld bags gives a bag a temporary bond. This temporary bond enables the user to quickly find the bag bottom regardless of how he/she is opening and preparing the bag for use. With angular cold seals, the bottom portions of the side gussets on bottom seal bags will fold upon themselves, forming a flat base. Alternately, the cold seals may be applied to the outside portions of the bottom gusset on sideweld bags which portions will then fold upon themselves and form a flat base. Folding occurs whether this folding is by capturing air in a bag, shaking it, or by placing a hand inside the bag and pushing the gussets down at the bottom, the result is the same—a bag manufactured in the lay flat state that squares out and tends to stand up. It will be noted that the cold seals here disclosed may lose their bond after some repetitive reuse. However, plastic bags have a one time use requirement, especially the typical bags used in supermarkets, fast food chains and so on. Generally speaking, these carry out and point of purchase bags are only opened and filled one time. For instance, a bag used in a fast food restaurant is only filled once; a bag used for as a point of purchase bag for cookies is only filled once at the cookie factory.

The present invention also reveals for the first time a means of impressing hinges and temporarily cold sealing plastic film that can be precisely executed so that the impressions and temporary seals are accurately applied to predetermined panels or bag plies. Furthermore, the process of the present invention will reveal that these impressions and temporary seals may be perfectly registered as required in the bag making process.

When impressing hinges and temporary cold seals to form stand up style bags, it is typically applied to the film in its lay flat condition, which—unlike prior art—entirely eliminates the cumbersome, time consuming folding methodologies or the heat sealing processes previously discussed. Furthermore, hinge impressing and temporary cold sealing are easily adapted to existing high-speed bag making equipment and technology—both bottom seal and side weld—and can be placed on multiple lanes without substantially affecting line speed. The process of applying hinging by cold seals may also be done simultaneously during one single impressing operation. The impressing and temporary seal processes can be applied to common plastic bags at present day high speeds and with great accuracy to consistently produce high quality, square bottom plastic bags that stand up.

The process of the present invention opens up new possibilities in the use of cold seal technology in the plastic bag and film industry. For instance, the hinging effect is also a reliable means to create new bag shapes and bottom configurations, such as bags with flat, octagonal, hexagonal or decagonal bottoms. As discussed in cross reference, hinges can cause the bottom portions of the side gussets on bottom seal bags will fold down upon themselves, forming a flat base. Or, hinges may be applied to the outside portions of the bottom gusset on side weld bags which portions will then fold out upon themselves and form a flat base. Used in concert with cold or warm temporary seals, the reliability in performance of the product may be significantly improved. Impressed hinges with accompanying cold or warm temporary seals can cause side weld bags to stand more upright and erect with their side welded ends folding inward, forming a squarer bag shape and improving the ability to load the bag. As illustrated in my co-pending Provisional Patent Application No. 60/088,613 filed Jun. 9, 1998 by the named inventor herein entitled Plastic Film Hinging now patent application Ser. No. 09/257,345 filed Feb. 25, 1999 of even date herewith entitled Plastic Film Hinging and Precreasing Process is likewise incorporated by reference as if fully set forth herein.

In this application, the impressing effect can also form an aesthetically appealing, registered embossing of a logo. The possibilities are endless.

The process of the present invention can also be reliably applied to laminated films and films that may be a combination plastic film and other materials such as foil or paper, for instance those used in point-of-purchase packaging. Many laminated films are made—of a thin layer of foil with a plastic outer or inner layer, frequently polyethylene. The two key variables in applying the present invention with films other than polyethylene are the temperature and the amount of pressure applied.

The impressing of hinges and applying cold or warm temporary seals is typically accomplished by applying pressure to a die upon a flat or round platen—or a die upon a matching, cooperating die—which in between lies one or more layers of plastic film. The process may also be effectively accomplished by the means of pressure embossing between rollers, one or more of which has a die impressing means. By using various combinations of dies, for instance male and female, male and male, two males and two females and so on various effects may be created. With heat being applied to the dies or rollers to create warm temperatures, the hinge or the temporary seal processes of the present invention are fast and highly effective and can easily keep up with the fastest high speed bag machines in the world.

DESCRIPTION OF THE SPECIFIC EMBODIMENTS

Figure 1:
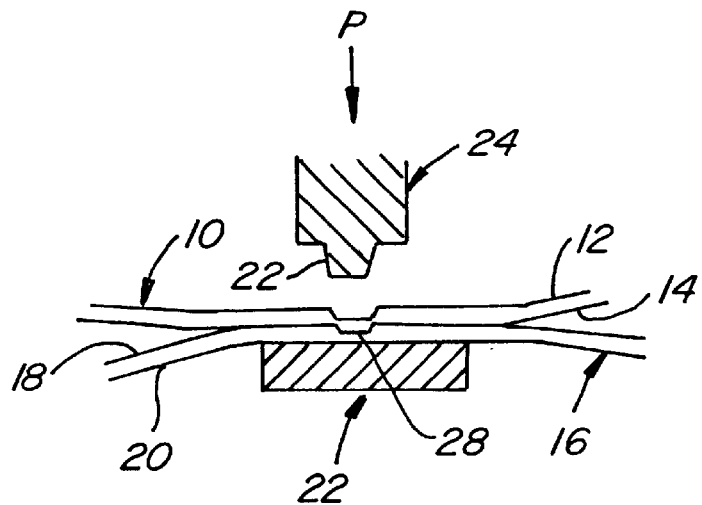
FIG. 1 is a blown-up cross sectional view of the present invention as a cold seal is being applied with a die and platen to 2 layers of plastic film.

In FIG. 1 film layer 10 has a top surface 12 and a bottom surface 14 and film layer 16 has a top surface 18 and a bottom surface 20, both of which film layers lie atop platen 22. As pressure P is applied to die 24 the blunted tip 26 impresses upon film layers 10 and 16 together forming cold seal 28. The two film layers compressed together form a relatively weak, temporary bond between bottom surface 14 of film layer 10 and top surface 18 of film layer 16. This type of cold seal may have unidirectional hinging properties as described in detail in my co-pending application Provisional Patent Application No. 60/088,613 filed Jun. 9, 1998 by the named inventor herein entitled Plastic Film Hinging now patent application Ser. No. 09/257,345 filed Feb. 25, 1999 of even date herewith entitled Plastic Film Hinging and Precreasing Process.

Figure 2:
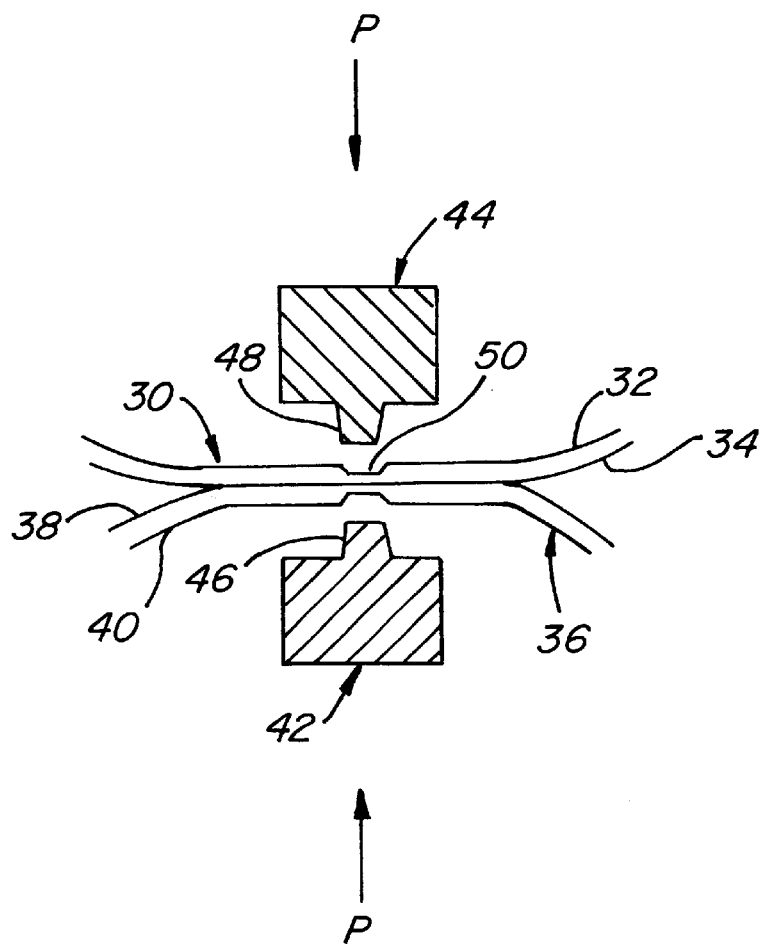
FIG. 2 is a blown-up cross sectional view of a variation of the present invention as a cold seal is being applied with matching dies to 2 layers of plastic film.

In FIG. 2 film layer 30 has a top surface 32 and a bottom surface 34 and film layer 36 has a top surface 38 and a bottom surface 40, both of which film layers lie between die 42 and matching die 44. Die 42 has a blunted tip 46 and die 44 has a matching blunted tip 48. As pressure P is applied to dies 42 and 44 the matching blunted tips 46 and 48 impress upon film layers 30 and 36 together forming cold seal 50. The two film layers compressed together form a relatively weak, temporary bond between bottom surface 34 of film layer 30 and top surface 38 of film layer 36. This type of cold seal may have bi-directional hinging properties as described in detail in my co-pending Provisional Patent Application No. 60/088,613 filed Jun. 9, 1998 by the named inventor herein entitled Plastic Film Hinging now patent application Ser. No. 09/257,345 filed Feb. 25, 1999 of even date herewith entitled Plastic Film Hinging and Precreasing Process.

Figure 3:
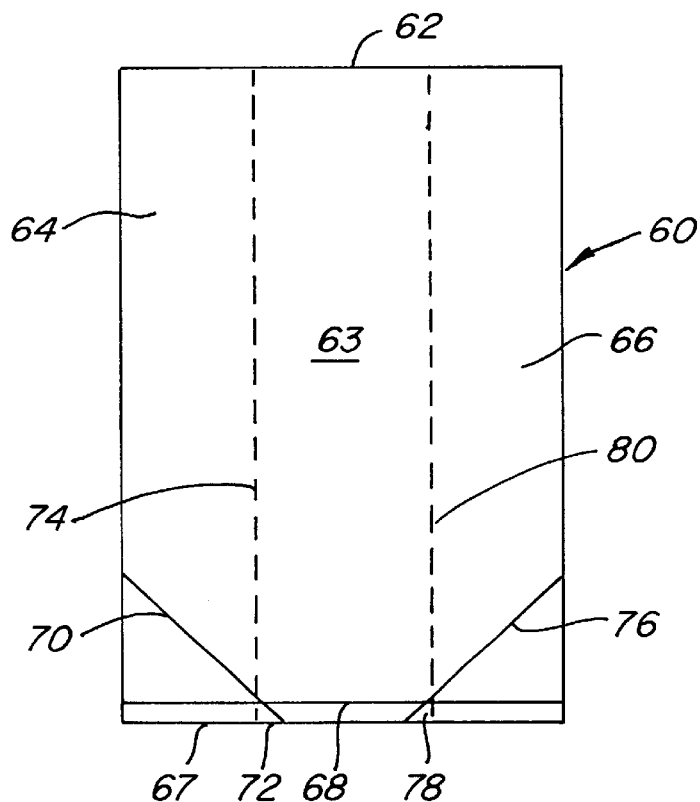
FIG. 3 is a plan view of a bag in which the cold seals and process in either FIG. 1 or 2 have been applied as angular seals.

In FIG. 3 bag 60 has an openable bag mouth 62 at the top, a front wall, 63 and a rear wall (not shown), two opposing side gussets 64 and 66, a bottom 67 formed by lateral bottom seal 68. At the base of gusset 64 is cold seal 70, which is like that described in either FIG. 1 or 2 and begins approximately at point 72 near where center gusset crease 74 meets the lateral bottom seal 68, and has been impressed upon both of the underlying gusset panels 82 and 84 (not shown) in gusset 64 and rear bag wall (not shown), at an approximate 45 degree angle, and; opposing cold seal 70 is another cold seal 76 at the base of gusset 66, which begins approximately at point 78 where center gusset crease 80 meets the lateral bottom seal 68, and has been impressed upon both of the underlying gusset panels 86 and 88 (not shown) in gusset 66 and the rear bag wall (not shown) at an approximate 45 degree angle.

Figure 4:
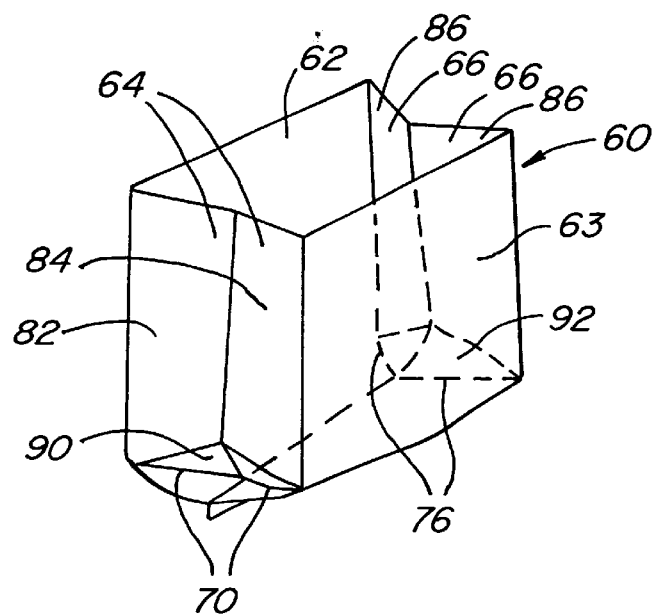
FIG. 4 is a perspective view of the bag in FIG. 5 as it is opened and illustrates how the bottom tends to naturally square out.

In FIG. 4 bag 60 of FIG. 3 is opened at bag mouth 62 allowing side gussets 64 and 66 to openably expand. As bag 60 is opened, front wall 63 expands forward, whereas hinge 70 enables the gusset panels 82 and 84 of side gusset 64 to fold down and out upon themselves, while simultaneously cold seal 76 (dotted lines) enables the gusset panels 86 and 88 of side gusset 66 to fold down and out upon themselves, thereby and together cold seals 70 and 76 cause the tendency of the lower and outer gusset regions 90 and 92 of bag 60 to symmetrically lay down and square out. The reason why cold seals 70 and 76 and their corresponding gusset panels 82 and 84 and 86 and 88 respectively tend to fold down and out and upon themselves is because when a user opens the bag the incoming air causes the bag walls to billow outwards (any cold seal bonding of the outside surfaces of gusset panels 82 to 84 and 86 to 88 are now broken) in which cold seals 70 and 76 cause the underlying gusset regions 90 and 92 to respectively fold down and out upon themselves as they are maintained in their flattened relationship. Similarly this can be accomplished by the user simply placing a hand inside the bag and pushing downward to "find the bottom" or can be accomplished when the bag is filled with goods, such as rice, sugar or even liquids.

Figure 5:
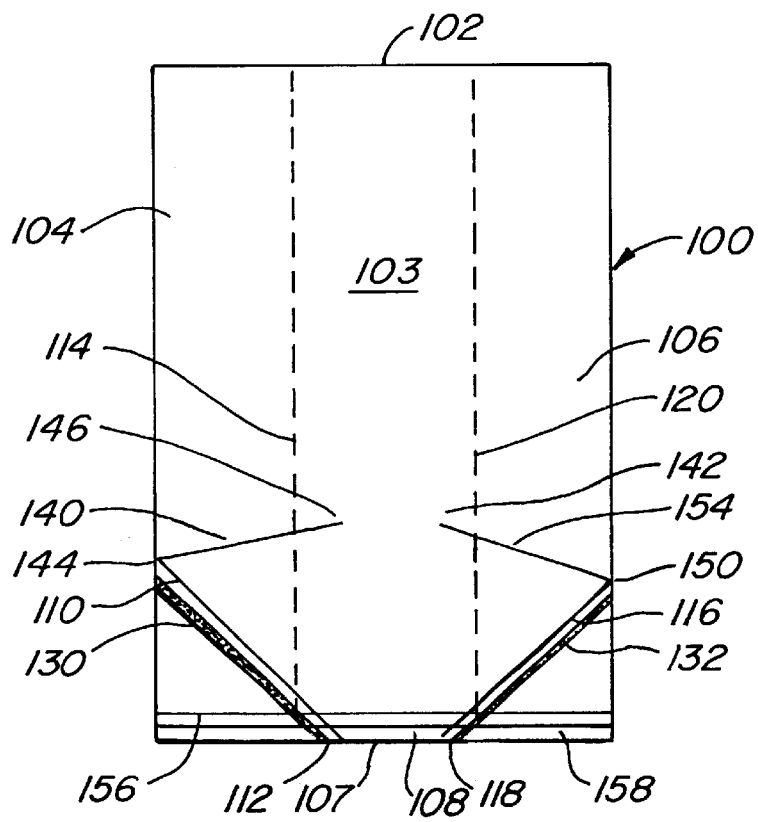
FIG. 5 is a plan view of a bag in which cold seals have been applied along with bidirectional hinges.
Figure 6:
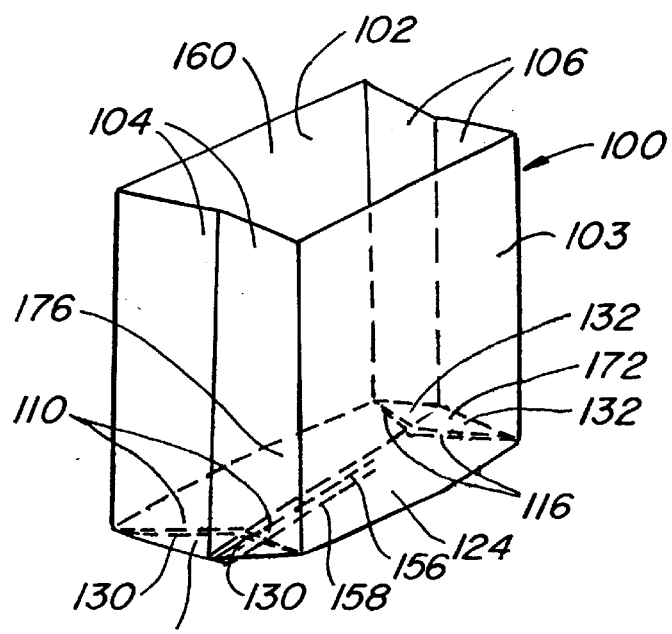
FIG. 6 is a perspective view of the bag in FIG. 5 as it is opened and illustrates how the bottom tends to naturally square out.

In FIG. 5, the preferred version of the present invention in a square bottom bag form that may be used in a retail or perhaps point of purchase application is bag 100, which has an openable bag mouth 102 at the top, a front wall, 103 and a rear wall (not shown), two opposing side gussets 104 and 106, and a bottom 107 formed by lateral bottom seal 108. At the base of gusset 104 is a bidirectional hinge 110 which begins approximately at point 112 just inside where center gusset crease 114 meets the lateral bottom seal 108, and has been impressed upon both of the underlying gusset panels 122 and 124 (see FIG. 6) in gusset 104 and the rear bag wall (not shown) at an approximate 45 degree angle, and; opposing hinge 110 at the base of gusset 106 is another bidirectional hinge 116, which begins approximately at point 118 just inside where center gusset crease 120 meets the lateral bottom seal 108, and has been impressed upon both of the underlying gusset panels 126 and 128 (see FIG. 6) in gusset 106 and rear bag wall (not shown), at an approximate 45 degree angle. Immediately adjacent bidirectional hinges 110 and 116, and running parallel to, are impressed cold seals 130 and 132, which are about ⅛" wide. Two additional bidirectional hinges 140 and 142 have been impressed laterally across the outer portions of front panel 103, the rear panel (not shown), and through both side gussets 104 and 106 respectively and their gusset panels 122 and 124 and 126 and 128 respectively (FIG. 6). Lateral hinge 140 begins at the approximate top, outside end 144 of hinge 110 and extends inwardly at a 15 degree angle and terminates after passing across the center crease 114 in gusset 104 at point 146 which is approximately 1" inside center crease 114, and; lateral hinge 142 begins at the approximate top, outside end 150 of hinge 116 and extends inwardly at a 15 degree angle and terminates after passing across the center crease 120 in gusset 106 at point 154 which is approximately 1" inside center crease 120. Lateral bidirectional hinges 140 and 142 being impressed at the 15-degree angle enable the bag bottom to open up and square out easily. This is explained in greater detail in the co-pending Provisional Patent Application No. 60/088,613 filed Jun. 9, 1998 by the named inventor herein entitled Plastic Film Hinging patent application Ser. No. 09/257,345 filed Feb. 25, 1999 of even date herewith entitled Plastic Film Hinging and Precreasing Process.

Just above bottom seal 108 at the bottom of front wall 103, lies a lateral, single unidirectional hinge 156, which is impressed upon all four bag plies. Below bottom seal 108 is bag skirt 158. It should be appreciated that all of the hinges and cold seals in bag 100 may be made in one single operation by impressing dies upon all 4 plies in the layflat tubing, and can be done at virtually full line speed, simultaneously on 3–5 lanes across. It is during this operation that simple gusseting fins mounted on the die impressing machinery—which double as lane guides—may be inserted between the side gussets to break any cold seals that may have bonded together the two outside surfaces of gusset panels 122 and 124 or 126 and 128 respectively. Furthermore, this entire operation may be accomplished either before or after the bags have been cut and the bottoms sealed. Doing this single operation at virtually full line speed with existing labor crews and before bag 100 enters the final cutting and sealing operation eliminates the need for an extra manufacturing step that would typically require additional handling and labor.

In FIG. 6 bag 100 is fully opened, squared out and standing fully upright. It has been opened much like that of bag 60 as shown in FIGS. 3 and 4. However, the preferred attributes of bag 100 enable it to more readily cooperate with a user's squaring out and standing up operation. As illustrated, bag 100 is fully open at bag mouth 102, in which side gussets 104 and 106 and front wall 103 and rear wall 160 are fully expanded outward. Bidirectional bag hinges 110 and 116 are completely folded down and out upon themselves. Adjacent bidirectional hinges 110 and 116, the cold seals 130 and 132—which have aided in the squaring out process by their bonding of their respective side gusset panels, maintaining their flattened relationship—are now laying flat on the bottom of bag 100. The two lateral bidirectional hinges 140 and 142 have fully cooperated with the gusset hinges 110 and 116 and the cold seals 130 and 132, and have neatly created the lower and outer gusset regions 170 and 172, which have symmetrically squared out and now form the outer regions of the bag's bottom. This newly defined bottom, which consists of outer gusset regions 170 and 172 plus lower front panel region 174 and rear panel region 176, serves as a stable base upon which the bag rests and stands up. As illustrated, this base has a slightly octagonal (or decagonal) shape. Unidirectional hinge 156 has also caused the bottom seal 108 and skirt 158 to neatly fold under the bag's bottom and not conflict with the squaring out effect. This combination of cold seals and hinges can reliably cause an otherwise common side gusseted plastic bag to square out and stand up.

Figure 7:
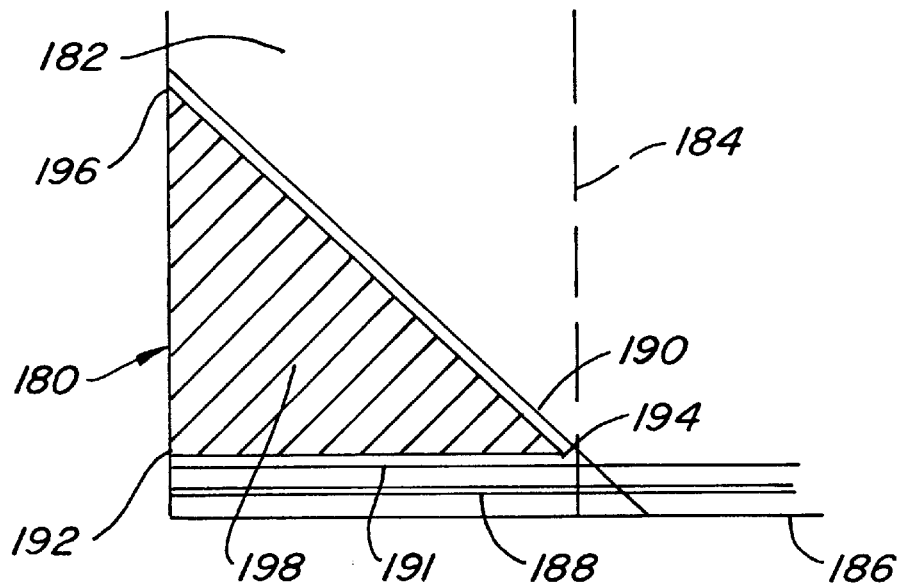
FIG. 7 is a partial view of another cold seal application on the side gussets to create a flat bottom bag.

In FIG. 7 left bottom portion of bag 180 is formed much like that of the bags in FIGS. 3, 4, 5 and 6 and has a side gusset 182, a center gusset crease 184, a bottom 186 formed by bottom seal 188. A bidirectional hinge 190 has been impressed upon bag 180 and gusset 182 in much the same manner as described in FIGS. 5 and 6 and a unidirectional hinge 191 has been impressed upon bag 180 and gusset 182 also in much the same manner as previously described in FIGS. 5 and 6. The triangular portion that lies in between points 192, 194 and 196 and defined by shade lines, is cold seal 198. This large block cold seal portion is formed by the same impression methods as defined in FIGS. 1 and 2 and serves essentially the same purpose as the cold seals described in FIGS. 3, 4, 5 and 6.

Figure 8:
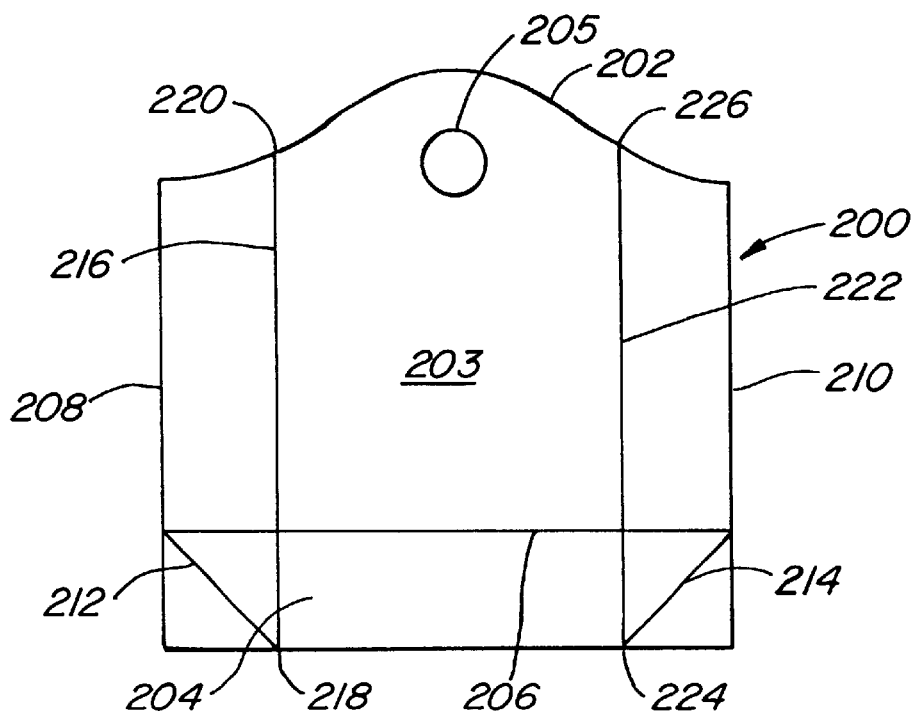
FIG. 8 is a plan view of a bag in which the cold seals and process in either FIG. 1 or 2 have been applied as angular seals to a sideweld bag along with bidirectional hinges.

In FIG. 8 sideweld bag 200 has a top 202, a front panel 203, a rear panel (not shown), a die cut handle 205, a bottom gusset 204 and its center gusset crease 206, and sidewelded edges 208 and 210. At 45 =l degree angles in both outer regions of bottom gusset 204 are cold seals 212 and 214 which respectively terminate approximately at the point where center crease 206 crosses sideweld 208 and where center crease 206 crosses sideweld 210. A vertical bidirectional hinge 216 begins at point 218 and terminates at point 220 and another bidirectional hinge 222 begins at point 224 and ends at point 226, both of which hinges have been impressed upon front wall 203, rear bag wall (not shown) and bottom gusset 204.

Figure 9:
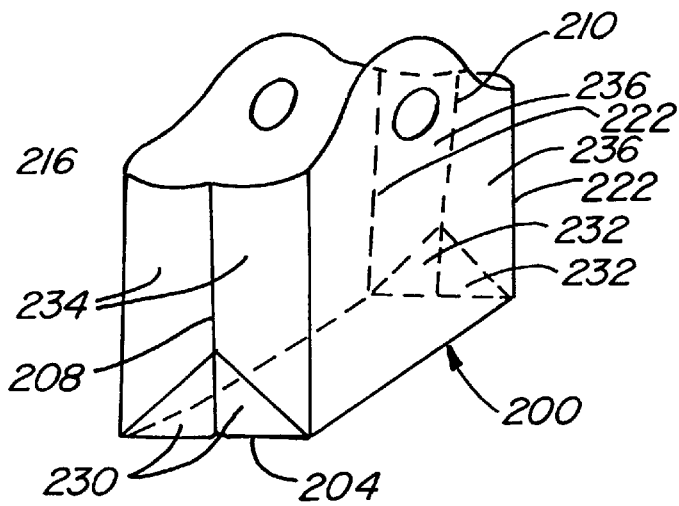
FIG. 9 is a perspective view of the bag in FIG. 5 as it is opened and illustrates how the bottom tends to naturally square out.

In FIG. 9 the sideweld bag 200 of FIG. 8 has been opened and sets upright upon bottom gusset 204 as cold seals 212 and 214 cause the lower outer regions 230 and 232 respectively to turn upright and help square out the bottom gusset assisting in the formation of a flat base. In turn, bidirectional hinge 216 causes the upper outer region 234 to stand up and box out and sideweld 208 to cooperate by turning inward, while hinge 222 causes its respective upper outer region 236 to stand up and box out and sideweld 210 to cooperate by turning inward. Bag 200 is now ready to be loaded. It is easy to see that cold sealing the bottom gusset in sideweld bags has a similar outcome as cold sealing the side gussets in bottom seal bags described in FIGS. 3, 4, 5, 6 and 7.

Figure 10:
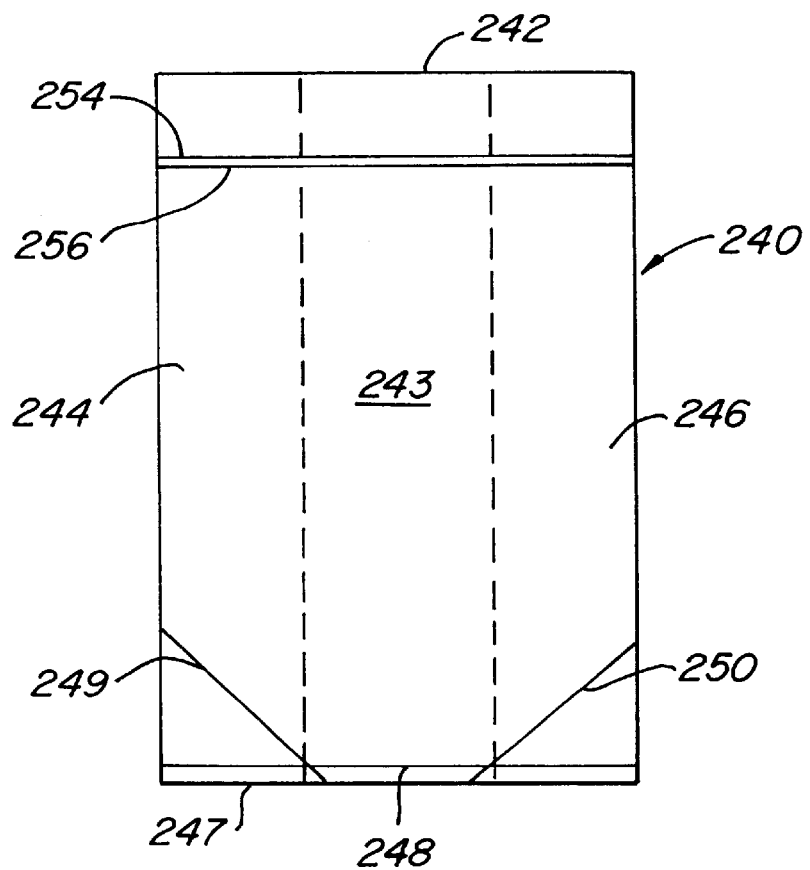
FIG. 10 is a plan view of a bag in which double bidirectional hinges have been applied near the bag top to form a valise-like closure near the bag mouth.

In FIG. 10 bag 240 is much like that of the bag in FIG. 3, with an openable mouth 242 at the top, a front wall 243, a rear wall (not shown), side gussets 244 and 246, a bottom 247 formed by bottom seal 248, two angular cold seals 249 and 252, and near the top are two lateral unidirectional hinges 254 and 256 providing a valise-like closure.

Figure 11:
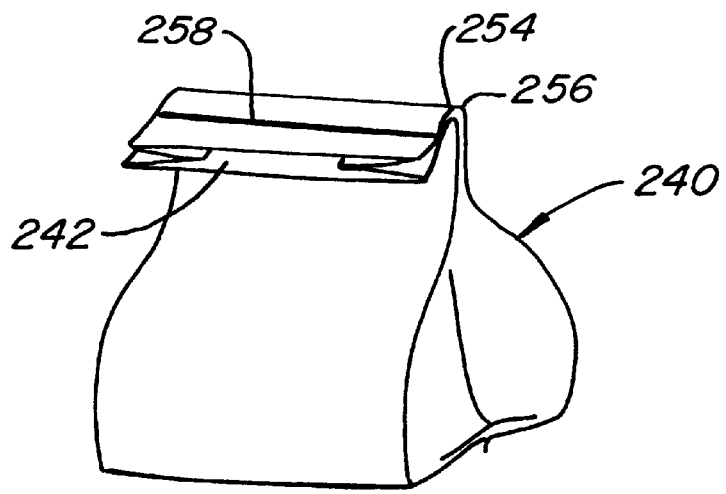
FIG. 11 is a perspective view of the bag in FIG. 12, in which the valise-like closure is folded over, and the bag mouth is sealed with a cold seal.

In FIG. 11 bag 240 of FIG. 10 is shown loaded with goods (not shown) that have been placed inside the bag causing bag 240 to set upright. Bag mouth 242 now points downward as bag 240 has been folded over at the two lateral, unidirectional hinges 254 and 256 shown in phantom. This "valise-like" closure has helped align the four bag plies while a single cold seal 258 has been applied. This cold seal, along with the two unidirectional hinges 254 and 256, provide short-term preservation of foods and provide tamper resistance.

Figure 12:
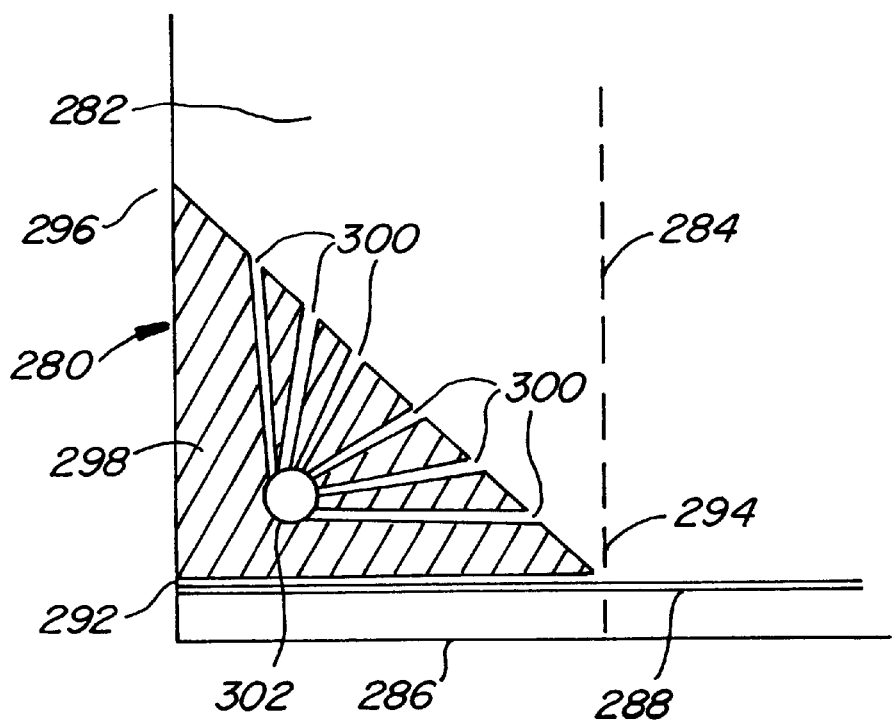
FIG. 12 is a partial view of another cold seal application on the side gussets to create a flat bottom bag and may allow air to escape.

In FIG. 12 left bottom portion of bag 280 is formed much like that of the bags in FIGS. 3, 4, 5 and 6 and has a side gusset 282, a center gusset crease 284, a bottom 286 formed by bottom seal 288. The triangular portion that lies in between points 292, 294 and 296 and defined by shade lines, is cold seal region 298. This large block cold seal region is formed by the same impression methods as defined in FIGS. 1 and 2 and serves essentially the same purpose as the cold seals described in FIGS. 3, 4, 5, 6 and 7. Running throughout triangular cold seal 298 are a series of channels 300 that are not cold sealed, all of which channels lead to an open hole 302, which hole is cut clear though all four plies of bag film. Upon the loading of bag 280, captured air may be able to escape through channels 300 as it is forcefully expelled until such time as the weight of the contents in bag 280 causes the film layers about cold seal 298 to rest flattened upon themselves thereby cutting off channels 300 so that no contents accidentally leak out.

Figure 13:
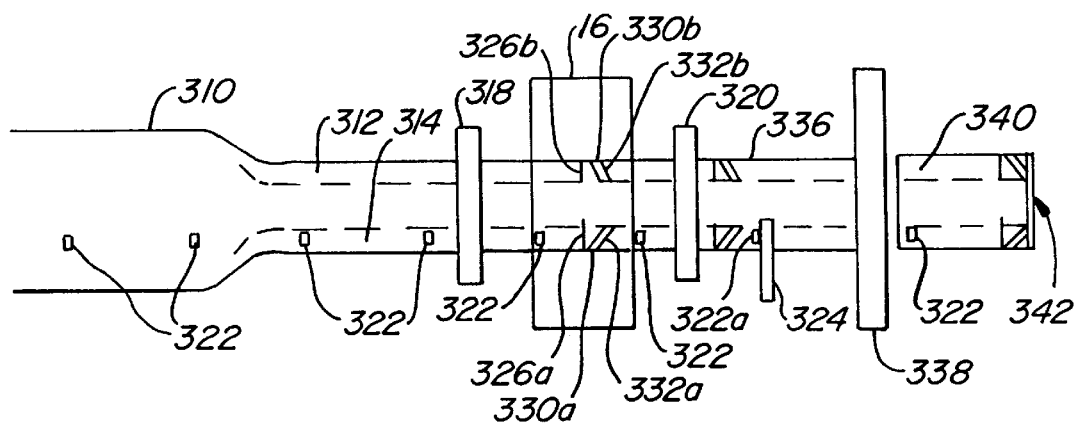
FIG. 13 is a plan view of the process of the present invention as it would be adapted to a standard manufacturing process.

In FIG. 13 a line machine is schematically shown. The impressing/seating process of the present invention begins with flattened tube 310, printed with multiple eyespots 322, which tube 310 is gusseted at 312 and 314, fed through impresser 316, which lies between nip rollers 318 and 320. Tube 310 stops at a predetermined point when printed eyespot 322a on tube 310 is read by electric eye 324. Electric eye 324 triggers impresser 316 (cut-away view), which then makes two horizontal impressions forming hinges 326a and 326b, two angular impressions forming hinges 330a and 330b, and two cold temporary seals -332a and 332b through all the plies in gussets 316 and 318. Leaving impresser 316, flattened, gusseted, and the now impressed and temporarily cold sealed tube 336 enters bottom sealer 338, is hot sealed to form a bag bottom and is severed at a predetermined location as eyespot 322a also triggers this hot sealing and severing operation. As shown, this hot sealing and severing operation has just made individual bag 340, which bag 340 has been transported forward onto bag stack 342 (not illustrated as it lies underneath bag 340). Bag 340 has one complete set of impressions creating horizontal and angular hinges and angular cold seals as described. Bag stack 342 will then be transferred down line to a die cutting operation or to a packing station. All together, this would conclude a typical, standard manufacturing process to create a square bottom bag under the process of the present invention.

In FIG. 13, it is easy to understand that the impressing, cold sealing process of the present invention could be simultaneously accomplished on multiple lanes across. For instance, 2 to 5 or more bag lines could be used. The cold seals could be applied after the tube is severed and sealed into individual bags and before they are stacked up. It is also easy to understand that any number of combinations of impressions and cold seals may be made in just about any configuration or on any location on the flattened tubing, in particular any one of those co-pending Provisional Patent Application No. 60/088,613 filed Jun. 9, 1998 by the named inventor herein entitled Plastic Film Hinging now patent application Ser. No. 09/257,345 filed Feb. 25, 1999 of even date herewith entitled Plastic Film Hinging and Precreasing Process: Provisional Patent Application entitled Cold Sealing of Plastic Film No. 60/088,612 filed Jun. 9, 1998. by the named inventor herein, now patent application Ser. No. 09/257,848 filed Feb. 25, 1999 of even date herewith entitled Apparatus and Process for Cold Seal in Plastic Bags; and Provisional Patent Application No. 60/089,582 filed Jun. 17, 1998 by the named inventor herein entitled Plastic Bag Bundling System now patent application Ser. No. 09/258,015 filed Feb. 25, 1999 of even date herewith entitled Plastic Bag Bundling System.

The bags with the impressions and temporary cold seals may also be made without the use of printed eyespots and electric eyes, which alternative would somewhat lessen the accuracy of the impressing and cold temporary seal location on the film.

Figure 14:
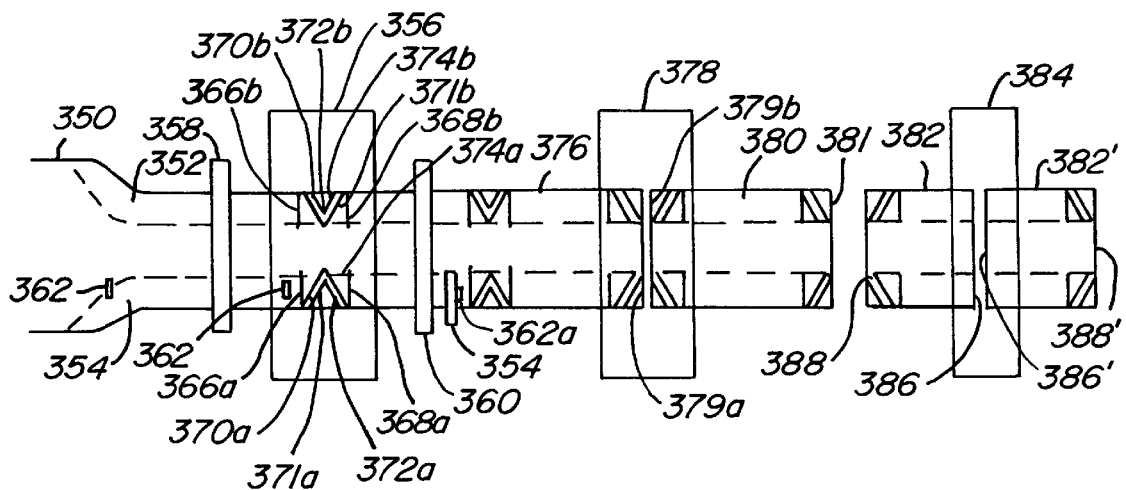
FIG. 14 illustrates the impressing and/or cold sealing process of the present invention in another of the preferred embodiments in which bags are being made according to the improved process revealed in my co-pending application Provisional Patent Application No. 60/092,232 filed Jul. 9, 1998 entitled Plastic Bag Manufacturing Process by the named inventor herein. patent application Ser. No. 09/257,361 filed Feb. 25, 1999 of even date herewith entitled Plastic Bag Manufacturing Process is likewise incorporated by reference as if fully set forth herein.

In FIG. 14 the impressing and temporary sealing process of the present invention begins with flattened, printed tube 350, printed with multiple eyespots 362, which is gusseted at 352 and 354, fed through impresser 356 (illustrated in cut-away, phantom view), which impresser lies between nip rollers 358 and 360. Tube 350 stops at a predetermined point when printed eyespot 362a on tube 350 is read by electric eye 354 triggering impresser 356, which then makes two mirrored sets of horizontal hinges 366a and 366b and 368a and 368b. Additionally, there are two mirrored sets of angular hinges 370a and 370b and 371a and 371b, and; two mirrored sets of angular cold seals 372a and 372b, and 374a and 374b, through gussets 352 and 354. Leaving impresser 356, flattened, gusseted, and now impressed and cold sealed tube 376 enters bottom sealer 378 (shown in a cut-away phantom view). Tube 376 is hot sealed with two lateral sealed edges 379a and 379b, which lateral sealed edges are severed in between, all of which is done at a predetermined location as eye spot 352a also triggers this hot sealing and severing operation. As shown, this hot sealing and severing operation has just made individual tube portion 380, which portion 380 is hot sealed at both lateral edges 379b and 381. Note that the sealed at lateral edges 379b and 381 of tube portion 380 lies approximately at the apex of where the two mirrored sets of angular cold seals 372a and 372b, and 374a and 374b meet. The cold seal also lies at the apex of where the two mirrored sets of angular hinges 370a and 370b and 371a and 371b meet, and midway between the two mirrored sets of horizontal hinges 366a and 366b and 368a and 368b. Tube portion 380 would then be stacked in a tube portion stack (not shown) of about 50–100 units and then transported forward once again to die cutting operation 384. Die cutting operation 384 severs the tube portion stack in a medial location forming two bag stacks 382 and 382'. This forms aligned bag mouths 386 and 386' opposing one another and resulting in the stacked laterally sealed edges 88 and 88' becoming the bottom seals of the newly formed opposing bag stacks 282 and 382'. All together, this would conclude a manufacturing process to create a square bottom bag according to the process revealed in my co-pending Provisional Patent Application No. 60/092,232 filed Jul. 9, 1998 entitled Plastic Bag Manufacturing Process by the named inventor herein now patent application Ser. No. 09/257,361 filed Feb. 25, 1999 of even date herewith entitled Plastic Bag Manufacturing Process.

Figure 15:
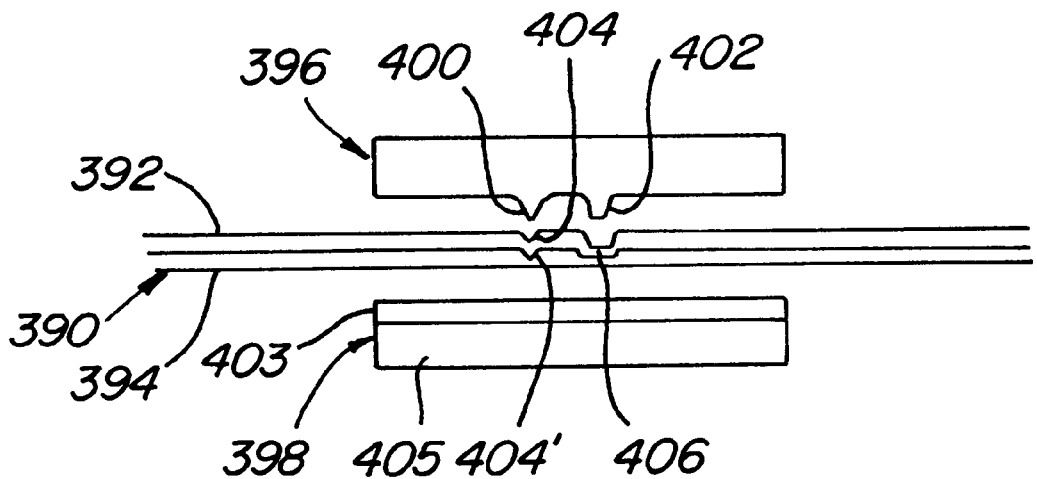
FIG. 15 is a side view of a die plate and platen layout of the present invention showing how one single die plate may contain both an impressing member and cold sealing member.

In FIG. 15 lay flat film 390 is shown with two layers, 392 and 394 which layers lie in between die plate 396 and platen 398. Die plate 396 has a first impressing member 400 to form a crease and a second impressing member 402 to form a cold seal. Platen 398 has a top layer 403 of a plastic or rubber material, generally about a 90 durometer, such as that of a ¼" silicon layer, which is backed by a ½"–¾" thick high density plastic layer 405. As shown, pressure has already been applied to die plate 396 upon layflat film 390, pressing against platen 398. Platten 398 impresses member 400 and has impressed creases 404 and 404' in film layers 392 and 394 respectively, and cold seal member 402 has likewise impressed cold temporary seal 406 in the two film layers 392 and 394 respectively. In this particular application, crease 404 is shown as being indented, which is typical. This indentation, in addition to be called a crease, may also be called a pre-crease, a hinge, a fold or pre-fold, a weakened line and so on. Regardless of description, the function is substantially the same, which may be that of serving as a hinge point, a vertical placed line of rigidity, or the embossing of a logo. In this FIG. 15, the cold temporary seal is shown as a slightly wider, blunter impression thus tending to seal the film layers over a broader area.

The determination of whether a member will create a crease or a cold seal is generally determined upon four primary factors. First, the narrower the member, the more it will tend to create a hinge or crease, and the wider a member, the more it will tend to create a temporary cold seal. Second, the hardness of the receiving platen will also dictate results as a softer platen tends to crease better and harder ones tend to seal better. Third, small variances in the height of the impressing members may also give different effects. In certain situations, it might be best to have a cold temporary sealing member a few thousands of an inch greater in height than a hinging, creasing member. Fourth, the amount of pressure applied also determines how effective a cold temporary seal or crease will be. As seen in the following FIG. 16, the creasing and sealing characteristics may be further improved with the additional application of heat. Based upon the teachings of the present invention, it is obvious that these two functions of hinges/creasing and cold temporary sealing may be accomplished in separate operations, or one or the other may not be required. It is also obvious, that under the right circumstances, a single operation may impress both a crease and simultaneously cause a cold temporary seal. The effect of all of the above possibilities is falls under the scope of the present invention.

Figure 16:
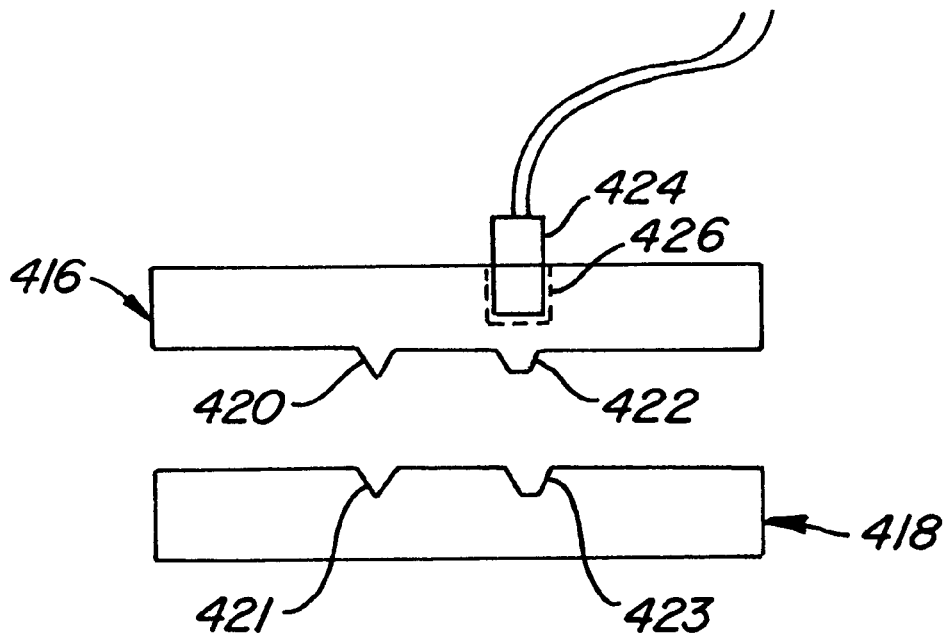
FIG. 16 is a side view showing the insertion of a heat cartridge to improve the creasing and to create warm temporary seals and illustrates a variation on the type of platen materials that may be used.

In FIG. 16 die plate 416 has a first impressing hinge member 420 and a second warm temporary sealing member 422. Above warm temporary sealing member 422 is a heat cartridge 424, which is inserted into a hole 426 of die plate 416. This heat cartridge 424 can generate sufficient BTU to heat temporary seal member 422 up to a temperature of about 245 degrees (for a 0.0009 mil thick high density polyethylene film) and when applied forms warm temporary seals on layflat film layers. In this example, the nearby impressing member 420 is typically heated to a temperature somewhat less (about 225 degrees) than the warm sealing member 422, due to being further away from heat cartridge 424. The advantage of heating the die plate means the impressing temporary sealing operations requires less pressure. Another advantage is that warm temporary seals also tend to be better seals than cold temporary seals. Furthermore, if the sealing temperature is raised to about 255 degrees or more for polyethylene, then the warm seals tend to become permanent. In other words, the warm seals created under pressure tend to take on the permanent characteristics of plastic film that has been sealed by traditional hot seal methodologies. Further in FIG. 16, the die platen 418 illustrated is made of a hardwood, preferably of a basswood or material of similar hardness (wood, wood composite or otherwise). In this illustration, the die platen has received at least one impression from die plate 416 which has formed receiving groove 421 for first impressing hinge member 420, and receiving groove 423 for second warm sealing member 422. The result is substantially the same as any of the hinging/creasing methodologies discussed herein or in co-pending Provisional Patent Application No. 60/088,613 filed Jun. 9, 1998 by the named inventor herein entitled Plastic Film Hinging, now patent application Ser. No. 09/257,345 filed Feb. 25, 1999 of even date herewith entitled Plastic Film Hinging and Precreasing Process: Provisional Patent Application entitled Cold Sealing of Plastic Film No. 60/088,612 filed Jun. 9, 1998. by the named inventor herein now patent application Ser. No. 09/257,848 filed Feb. 25, 1999 of even date herewith entitled Apparatus and Process for Cold Seal in Plastic Bags.

The impressed basswood tends to improve the hinging/creasing ability and tends to outlast plastics and rubber platens.

Figure 17:
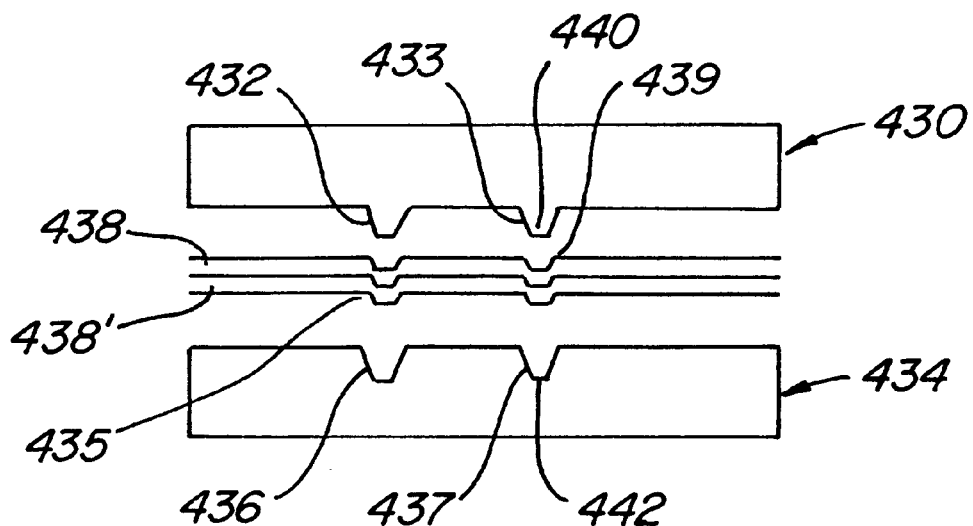
FIG. 17 is a side view of matching dies of the present invention showing how its creasing member and temporary sealing member may form creases and seals.

In FIG. 17 matching dies consist of top die plate 430 with male impressing member 432 and 433 and a bottom die plate 434 (which may be aluminum or steel to match the top die plate, or may even be basswood or other hard plastic material). This material does not have a memory when impressed. These impressing members match with female receiving grooves 436 and 437, which grooves are matched to receive male impressing members 432 and 433, respectively. In between top die plate 430 and bottom die plate 434 lies lay flat film layers 438 and 438'. Upon applying pressure to top plate 430, impressing member 432 presses upon lay flat film layers 438 and 438', firmly pushing it and impressing member 432 into receiving groove 436, which results in the creasing (or hinging) 435 of lay flat film layers 438 and 438'. Simultaneously, impressing member 433 presses upon lay flat film layers 438 and 438', firmly pushing it and impressing member 433 into receiving groove 437. This also results in the creasing and the cold sealing 439 of lay flat film layers 438 and 438' as the bottom edge 440 of male impressing member 433 bottoms out on the bottom surface 442 of receiving groove 437. As illustrated in matched dies 432 and 436, a crease may be formed in film layers 438 and 438' by having a female receiving groove, which is deeper than the male counterpart. Or, as anyone experienced in the art would understand, a crease and a cold seal may be formed by having a male member that "bottoms out" in its female receiving groove counterpart as illustrated in matched dies 433 and 437.

Figure 18:
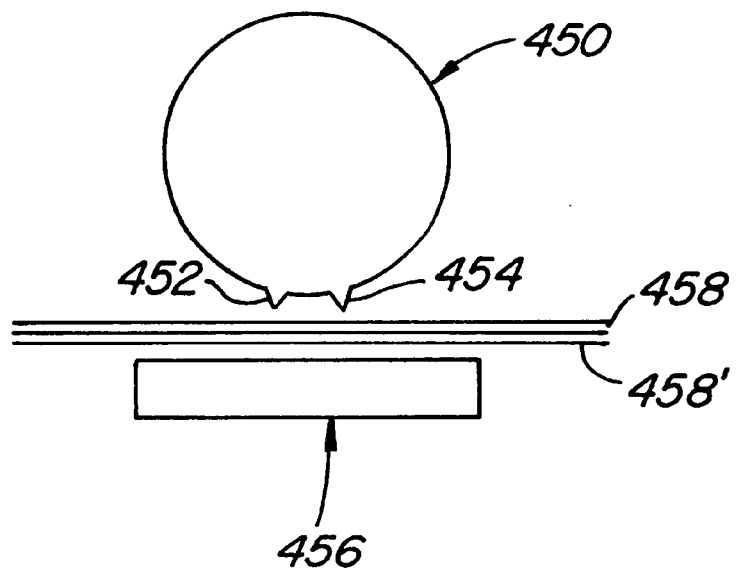
FIG. 18 is a side view of a round embosser, which has a creasing member and temporary sealing member used to form creases and cold seals.

In FIG. 18 round embosser 450 has first and second impressing members 452 and 454 and a receiving platen 456, which in between lies lay flat film layers 458 and 458'. With round embosser 450 pressed against film layers 458 and 458' and the receiving platen 456 below, and when lay flat film layers 458 and 458' pass under round embosser 450, embosser 450 rolls across film layers 458 and 458'. This impresses the two impressing members 452 and 454 upon layflat film layers 458 and 458' and against platen 456. The result is the impressing of a crease and/or cold seal in much the same manner as previously described. These impressions may also be registered, for instance by using an electric eye mechanism as previously described. One of the benefits of using this process is that the amount of pressure being applied to a rolling embosser may be greater than that of pressing together flat plates.

Figure 19:
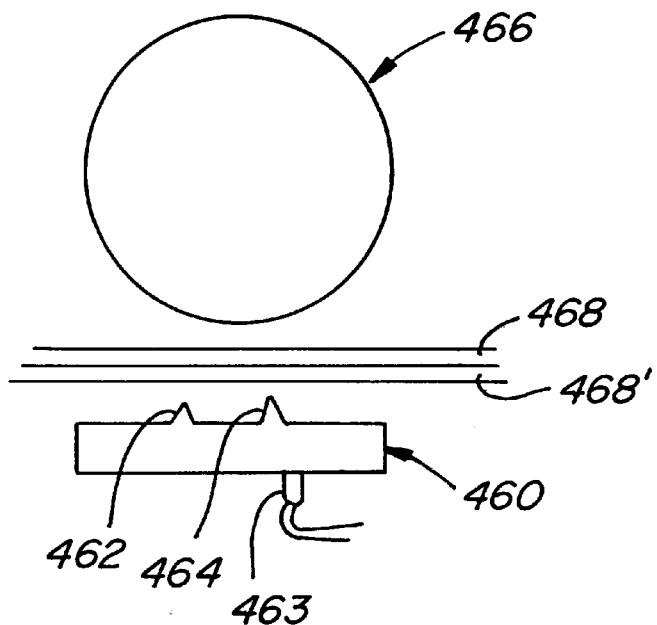
FIG. 19 is a side view of the preferred embodiment in which a round platen, which rolls against a die plate's creasing member and temporary sealing member forms creases and temporary warm seals.

In FIG. 19 flat die plate 460 has impressing members 462 and 464 and is heated by heating cartridge 463. A round platen 466 lies above die plate 460, which in between lies lay flat film 468. When lay flat film layers 468 and 468' pass over die plate 460 to a predetermined location, round platen 466 rolls across film layers 468 and 468' and presses upon layflat film layers 468 and 468'. This in turn is presses upon impressing members 462 and 464 of flat die plate 460. The result is the impressing of a crease and/or temporary warm seal by impressing members 462 and 464 in much the same manner as previously described in FIG. 18. By rolling a platen of about 90 durometer across a lay flat film positioned atop a die, heated or not, the pressure is concentrated at the point of contact. In this process, if the die is heated to about 250 degrees, a minimum amount of pressure will be required in order to form warm temporary seals. These warm temporary seals tend to be more evenly applied to the film as the pressure of the round platen conforms to the slight variations that may exist in the die's impressing members or the variations that be exist in the thickness of the multiple film layers. By increasing the temperature to 255 degrees or above, the seals then tend become warm permanent seals as previously described for high density film thickness of about 0.0009 inches.

Figure 20:
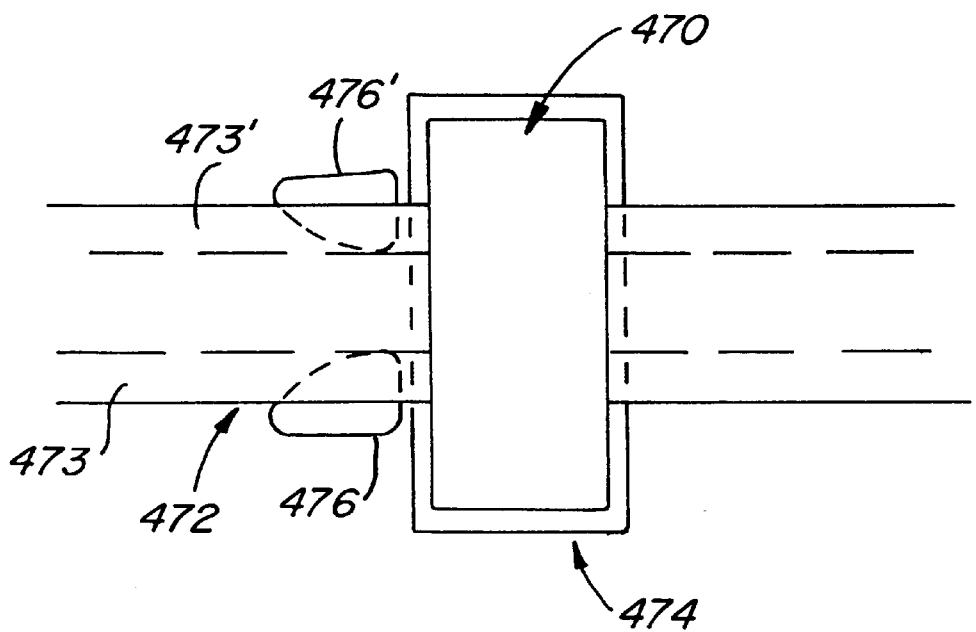
FIG. 20 is a plan view of any of the processes previously illustrated, which show a means of helping control and register the impressing of the crease and/or the cold sealing of the cold seal.

In FIG. 20 impressing die plate 470 is shown above gusseted lay flat film 472, which has a left side gusset 473 and a right side gusset 473', all of which-are above receiving platen 474. To help guide gusseted layflat film 472 as it travels below impressing device 470 and above platen 474, two gusset fins 476 and 476' are inserted. These insert into the side gussets 473 and 473', which gusset fins 476 and 476' and track lay flat film web 472 so that the gusseted lay flat film 472 is centered directly under impressing device 470 and above platen 474 in a predetermined channel. This means of tracking is a simple way of maintaining any gusseted film in a centered, channeled position above an impressing device and below its corresponding platen. The gusset fins 476 and 476' may also be inserted on the downward side of the production channel and serve to break apart any cold seal that has been made between the two inside panels composing gussets 473 and 473'. In use for square bottom bags, this improves the ability of the bag to quickly open, square out and stand up.

Figure 21:
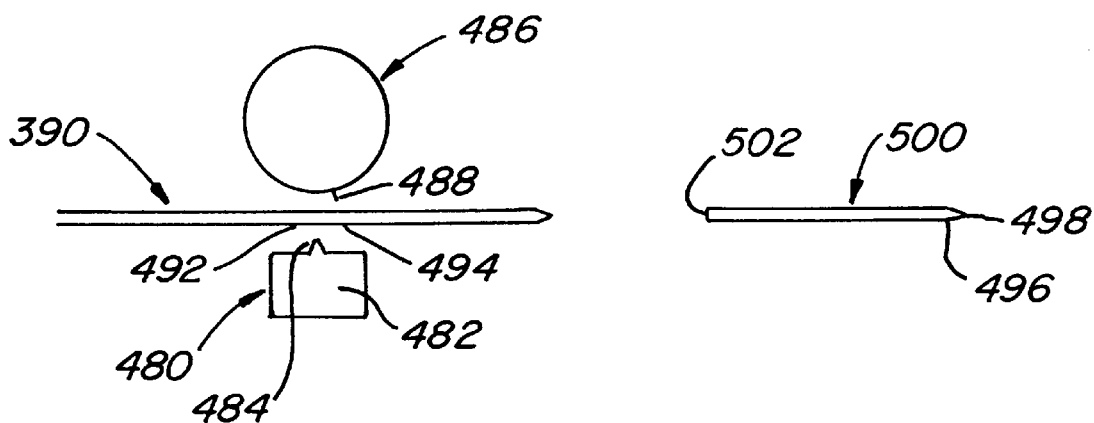
FIG. 21 is a side view of a means of forming a permanent, warm seal in a high-speed bag making process in its preferred embodiment.

In FIG. 21 warm seal bar 480 has a body 482 and a warm permanent seal edge member 484, with an internal heating means (not shown) which raises the temperature of seal bar 480 (and more specifically its seal bar edge 484) to 255 degrees or above. Above seal bar 480 lies platen roller 486, which roller has an integral knife edge 488. In between warm seal bar 480 and platen roller 486 lies layflat film tube 390. Upon impressing roller platen 486 atop warm seal bar 480, the lay flat film 490 is permanently sealed at location 492 where the platen rolls across seal edge member 484 and then is severed at location 494 where the integral knife edge 488 cuts lay flat film 490. As illustrated in bag 500, this sealing and severing operation forms a warm permanent seal 496 and a severed edge 498 creating a bag bottom and an open bag mouth 502 formed by the preceding sealing and severing operation. The advantages of this warm permanent seal process is that there is little or no time required to allow for the plastic seal to cool as would be required for the traditional molten plastic methods. Thus bag machine cycle speeds in a warm permanent seal application may literally be increased by 25 to 100 percent, depending upon the application. Furthermore the use of Teflon is not required at such low temperatures. It is also interesting to note that a round platen may also cross the die plate in a lateral direction. In such a case, the integral knife edge would also be a round blade, which would traverse and sever the underlying lay flat film adjacent the newly formed warm, permanent seal.

Figure 22:
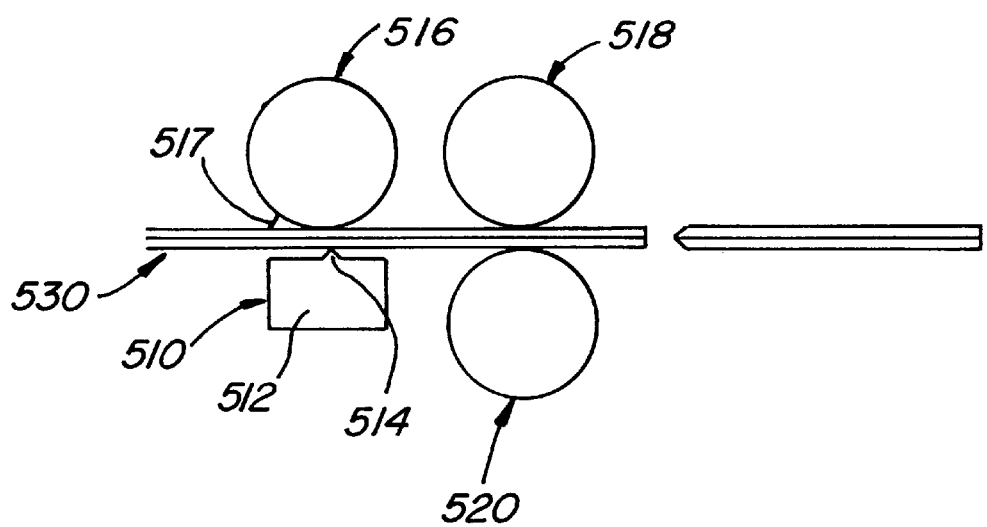
FIG. 22 is a side view of a variation of a means of forming a permanent, warm sealing in a high-speed bag making process.

In FIG. 22 warm seal bar 510 has a body 512 and a warm permanent seal edge member 514, with an internal heating means (not shown) raising the temperature of the seal bar 510 to 255 degrees or above. Above seal bar 510 lies a first platen roller 516, which roller has an integral knife edge 517. Next to first platen roller 516 is second roller 518, which below lies a third roller 520, both of which rollers 518 and 520 have been cooled substantially to a temperature of 70 degrees or less. In between warm seal bar 510 and platen roller 516 lies lay flat film 530, which is secured between second and third rollers 518 and 520 respectively. Upon impressing platen roller 516 atop warm seal bar 510, the lay flat film 530 receives a warm permanent seal in much the same manner as described in FIG. 21. However, just after film 530 receives its warm permanent seal, the seal is immediately cooled when it subsequently feeds through second and third rollers 518 and 520. This additional process which forms a warm permanent seal and then immediately cools it afterward will virtually assure that there will be no requirement to allow the molten plastic to set completely.

From the foregoing descriptions of the many processes of impressing hinges, pre-creases or folds and cold seals in plastic film, or applying cold or warm temporary seals or warm permanent seals, it will be appreciated that the number of new applications of the present invention are many. It is not the intention of the present invention to be limited solely to the few film products illustrated herein, but to be used in whatever conceivable manner to form a plastic bag or create special effects with plastic sheeting, films, laminated films or blended film products.

It is also not the intention of confining the use applying warm temporary seals to polyethylene films. Similar effects can be accomplished with other films such as polypropylene, nylon and so on at other temperature ranges and other pressures.

It is also not the intention of confining the use of applying warm permanent seals to polyethylene films. Similar effects can be accomplished with other films such as polypropylene, nylon and so on at other temperature ranges and other pressures.

It should also be understood that it is not the intention of limiting the present invention to the means of accomplishing the impressing of hinges or crease, cold temporary seals, warm temporary seals or warm permanent seals as described herein.

It should also be understood that the means of impressing hinges in plastic products might be accomplished in other manners with substantially the same results.

From the foregoing descriptions of the process and the many applications of using cold seals in plastic film and bag applications, it will be appreciated that the number of new applications of the present invention are many. It is not the intention of the present invention to be limited solely to the film products illustrated herein, but to be used in whatever conceivable manner to improve the performance of a plastic bag, sheet, or film or even envelope-like product. Cold seals can be applied to bottom sealed, side gusseted bags, bottom gusseted sideweld bags, back sealed bags and pouches.

It should also be appreciated that the means of impressing these cold seals in plastic products may be accomplished in other manners. For instance, rollers that are pointed at their roller ends could be run across plastic film to create hinges, or the pointed ends could fit into a female groove, which would create substantially the same effect. All that is needed is a modest amount of pressure. The intention of this application is not to limit the means of producing cold seals, but is to show that any type of pressure means properly applied, can indeed effect a cold seal.

Furthermore, while the present invention refers to cold seals of plastic film products, bags, pouches and so on, it should be understood that the same cold seal phenomena occurs when applied to a multitude of related film products such as laminates, foils and blends. For instance, popcorn bags typically made of laminated plastic and paper sheets would readily receive the impressing of cold seals. Pouches made from co-extruded film (some of which are foil laminates), commonly used for foods and liquids, with nylon middle layers and polyethylene inner layers would also receive cold seals effectively. Even bags of fertilizer or rock salt bags can be made to stand up when filled by using the cold seal technology of the present invention.

As this Application is about to be filed, we have determined preferred parameters of impressing the cold seal. We prefer to heat the compression die to about 245° F. for standard high density polyethylene. From this, the reader will understand that preferred temperatures and pressures are material dependent and thickness dependent upon the material being used. Utilizing the teachings here supplied, the routineer can easily determine the parameters required for any installation.

What is claimed is:

1. A process of cold sealing two layers of plastic film material together comprising the steps of:
   forming a plastic bag, the plastic bag including
      a front panel of plastic film having two substantially parallel side edges;
      a rear panel of plastic film having two substantially parallel side edges;
      a fastening of the front panel and rear panel for forming a continuous periphery to the bag; and,
      a bottom joining a bottom of the front panel, and a bottom of the rear panel at substantial right angles to the side edges of the front panel and rear panel;
      whereby the bag has a closed bottom, a continuous closed periphery, and an open top;
   an improvement providing the bag with a cold seal which does not form a part of the closed bottom, continuous closed periphery of the bag and open top, the process comprising the steps of:
      juxtaposing at least first and second plastic films of the bag to one another in a disposition for sealing;
      providing at least one compression die on at least one side of the juxtaposed at least first and second plastic films, the compression die having the size and shape of the cold seal desired;
      impressing the compression die across the juxtaposed first and second plastic films to produce a temperature and pressure sufficient to fuse the at least first and second plastic films together, the impressing having insufficient temperature and pressure to permanently fuse the first and second plastic films together so that the films when separated at the cold seal each retain structural integrity.

2. A process of cold sealing two layers of plastic film material together according to claim 1:
   the provided compression die includes first and second compression dies on opposite sides of the plastic film acting in opposition to one another.

3. A process of cold sealing two layers of plastic film material together according to claim 1:

intermittently advancing and stopping plastic films in juxtaposition to be sealed; and, impressing the plastic films in juxtaposition when at least first and second films are stopped.

4. A process of cold sealing two layers of plastic film material together according to claim 1:

providing at least one die mounted to a rotating support;

advancing plastic film to be cold sealed under the die;

rotating the support for the die to apply impressing to the plastic film at substantially the velocity of the passing film whereby the cold seal is placed to the plastic film while the plastic film is advancing.

5. A process of cold sealing two layers of plastic film material together according to claim 1 and wherein:

forming the plastic bag after the impressing step for the cold seal.

6. A process of cold sealing two layers of plastic film material together according to claim 1 comprising the additional steps of:

the provided at least one compression die is configured for placing a groove in at least one of the at least first and second plastic films.

7. A process of cold sealing two layers of plastic film material together according to claim 1 comprising the additional steps of:

the provided at least one compression die is configured for placing compression over an area of the juxtaposed at least first and second films.

8. A process of cold sealing two layers of plastic film material together according to claim 7 comprising the additional steps of:

the provided at least one compression dies defines non compression intervals for impressing air passageways for permitting air to move through the cold seal impressed between the first and second plastic films.

9. A process of cold sealing two layers of plastic film material together according to claim 8 comprising the additional steps of:

placing an aperture in the cold seal; and, communicating one of the air passageways with the aperture.

10. A process of cold sealing two layers of plastic film material together according to claim 1 comprising the additional steps of:

intermittently advancing and stopping the at least first and second films in juxtaposition; and, impressing the at least first and second films in juxtaposition when at least first and second films are stopped.

11. A process of cold sealing two layers of plastic film material together according to claim 4 comprising the additional steps of:

intermittently advancing and stopping the at least first and second films in juxtaposition at least 100 times per minute.

* * * * *